United States Patent
Yu et al.

(10) Patent No.: US 10,992,590 B2
(45) Date of Patent: Apr. 27, 2021

(54) PATH MAXIMUM TRANSMISSION UNIT (PMTU) DISCOVERY IN SOFTWARE-DEFINED NETWORKING (SDN) ENVIRONMENTS

(71) Applicant: Nicira, Inc., Palo Alto, CA (US)

(72) Inventors: Jia Yu, Palo Alto, CA (US); Xinhua Hong, Palo Alto, CA (US); Yong Wang, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 95 days.

(21) Appl. No.: 15/948,977

(22) Filed: Apr. 9, 2018

(65) Prior Publication Data

US 2019/0312820 A1    Oct. 10, 2019

(51) Int. Cl.
*H04L 12/805* (2013.01)
*H04L 12/741* (2013.01)

(52) U.S. Cl.
CPC .............. *H04L 47/36* (2013.01); *H04L 45/74* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 9,503,362 B2 | 11/2016 | Sreeramoju | |
| 9,537,797 B2 | 1/2017 | Sreeramoju | |
| 9,923,835 B1* | 3/2018 | Singh | H04L 12/4633 |
| 9,954,791 B2 | 4/2018 | Sreeramoju | |
| 2002/0188839 A1 | 12/2002 | Noehring et al. | |
| 2003/0076850 A1* | 4/2003 | Jason, Jr. | H04L 47/36 370/414 |
| 2005/0025185 A1 | 2/2005 | Brown et al. | |
| 2005/0281288 A1 | 12/2005 | Banerjee et al. | |
| 2006/0190594 A1 | 8/2006 | Jorgenson et al. | |
| 2007/0115963 A1 | 5/2007 | Vadlakonda et al. | |
| 2010/0097929 A1* | 4/2010 | Kimura | H04L 1/1867 370/230 |
| 2012/0051236 A1 | 3/2012 | Hegde et al. | |
| 2014/0241144 A1* | 8/2014 | Kashyap | H04L 47/365 370/216 |
| 2014/0269415 A1* | 9/2014 | Banavalikar | H04L 45/24 370/254 |
| 2015/0188833 A1* | 7/2015 | Fusco | G06F 9/45533 718/1 |

(Continued)

*Primary Examiner* — Ayaz R Sheikh
*Assistant Examiner* — Faiyazhan Ghafoerkhan
(74) *Attorney, Agent, or Firm* — Su IP Consulting (57) ABSTRACT

Example methods are provided for a network device to perform path maximum transmission unit discovery (PMTU) in a software-defined networking (SDN) environment. One example method may comprise detecting an egress packet that includes an inner header. The method may also comprise: in response to determination that a first maximum transmission unit (MTU) associated with a path between the first node and the second node is exceeded by a total size of the egress packet and an encapsulation overhead, generating an error packet that specifies a second MTU that is configured to be less than the first MTU based on the encapsulation overhead. The error packet may be sent to the first node to cause the first node to size a subsequent egress packet to the second inner address based on the second MTU.

22 Claims, 8 Drawing Sheets

(56) References Cited

U.S. PATENT DOCUMENTS

| | | |
|---|---|---|
| 2015/0365357 A1* | 12/2015 | Sreeramoju ............. H04L 47/36 370/218 |
| 2015/0381494 A1* | 12/2015 | Cherian ................ H04L 45/745 370/392 |
| 2015/0381509 A1 | 12/2015 | Sreeramoju |
| 2016/0019110 A1* | 1/2016 | Mosko .................... H04L 45/28 714/57 |
| 2016/0164794 A1* | 6/2016 | Ramalingam ......... H04L 47/365 370/235 |
| 2016/0248749 A1* | 8/2016 | Mahapatra .............. H04L 63/08 |
| 2016/0374133 A1 | 12/2016 | Logue et al. |
| 2016/0380902 A1 | 12/2016 | Sreeramoju |
| 2017/0005943 A1* | 1/2017 | Raj ......................... H04L 47/36 |
| 2017/0019331 A1* | 1/2017 | Yong ....................... H04L 45/64 |
| 2017/0019344 A1* | 1/2017 | Przygienda ............. H04L 12/18 |
| 2017/0295033 A1* | 10/2017 | Cherian ................ H04L 49/354 |
| 2017/0331755 A1* | 11/2017 | Gao .................... H04L 12/4135 |
| 2017/0339055 A1* | 11/2017 | Yamamoto ............. H04L 47/36 |
| 2020/0092254 A1* | 3/2020 | Goeringer ............... H04L 45/46 |

\* cited by examiner

PATH MAXIMUM TRANSMISSION UNIT (PMTU) DISCOVERY IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. Further, through SDN, benefits similar to server virtualization may be derived for networking services. For example, logical overlay networks may be provisioned, changed, stored, deleted and restored programmatically without having to reconfigure the underlying physical hardware architecture.

Path maximum transmission unit (PMTU) may refer generally to the maximum size of a packet that can be transmitted along a path from a source to a destination without requiring fragmentation. Any packet that is larger than the PMTU is generally fragmented or discarded. In practice, packet fragmentation and reassembly is undesirable because it unnecessarily wastes processing and network resources. For example, fragmenting a packet involves dividing the packet into smaller fragments, which causes more overhead for the destination to wait until all fragments are received for reassembly. Also, since each fragment generally has the same header overhead as the original message, the total number of bytes that needs to be transmitted increases. To avoid packet fragmentation, PMTU discovery may be performed such that the source may size packets for transmission to the destination accordingly. However, conventional approaches may not be suitable in SDN environments in which packets are encapsulated before they are sent.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
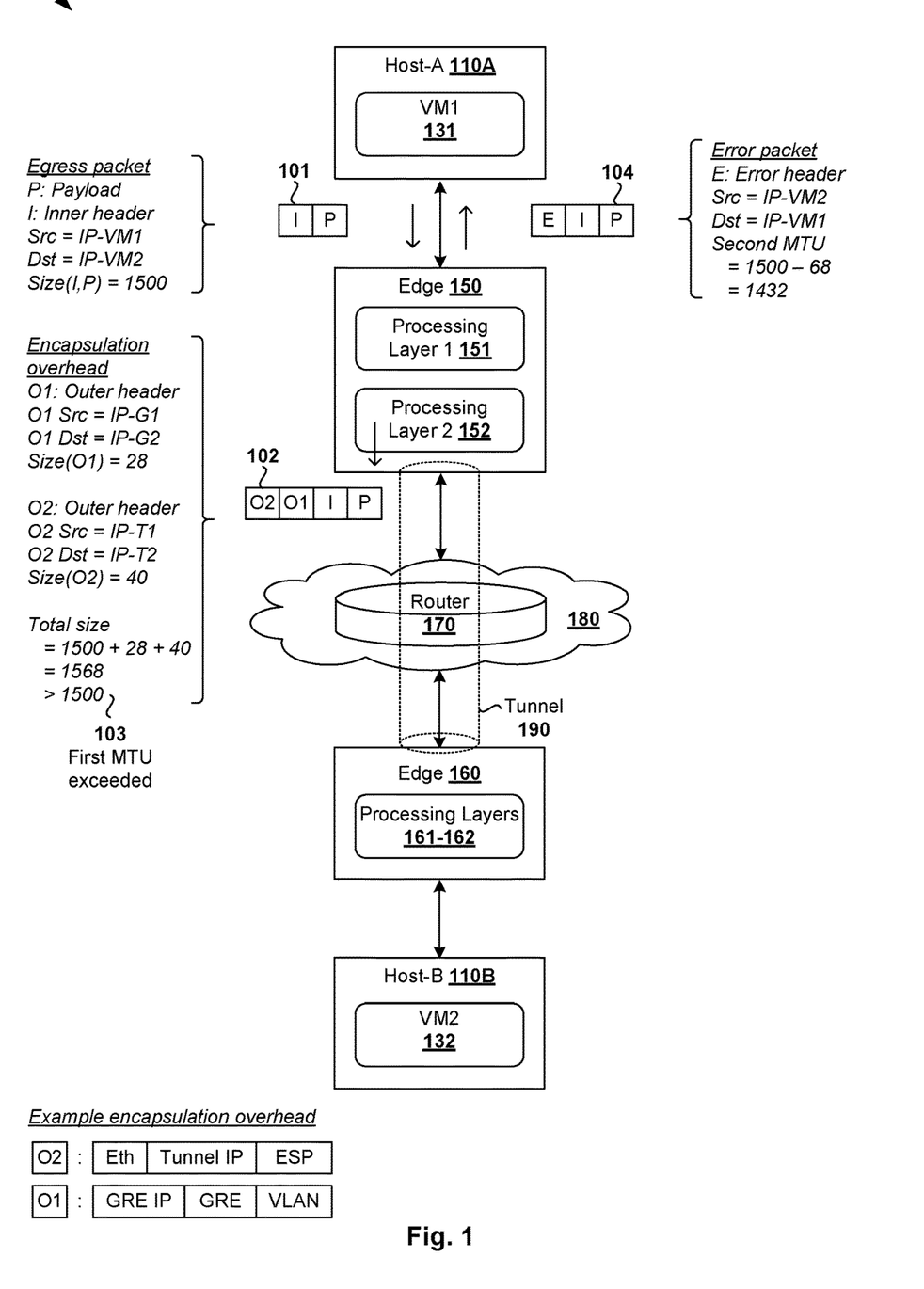
FIG. 1 is a schematic diagram illustrating an example software-defined networking (SDN) environment in which path maximum transmission unit (PMTU) discovery may be performed.
Figure 2:
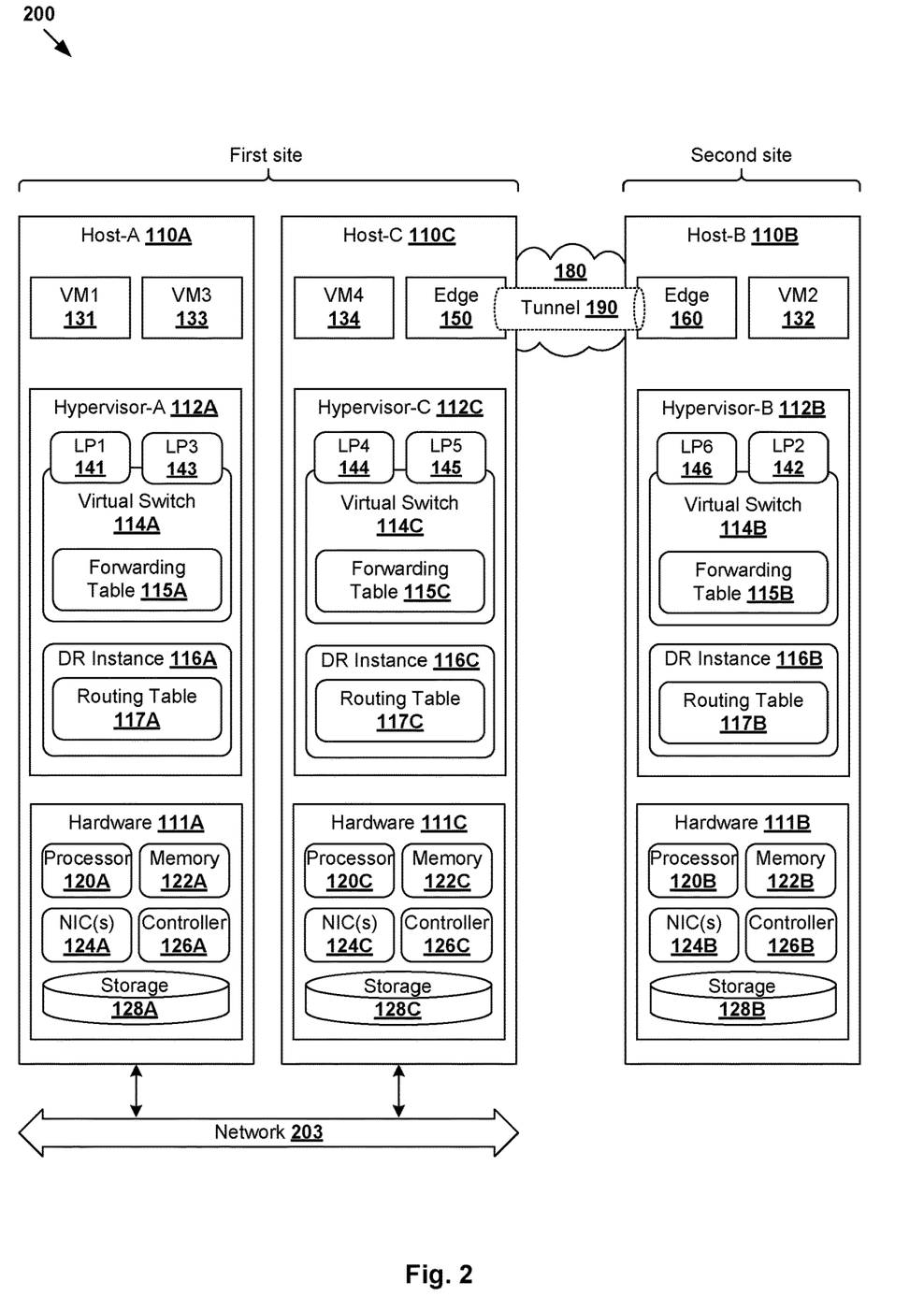
FIG. 2 is a schematic diagram illustrating an example physical view of the SDN environment in FIG. 1.

Challenges relating to path maximum transmission unit (PMTU) discovery will now be explained using FIG. 1 and FIG. 2. In particular, FIG. 1 is a schematic diagram illustrating example software-defined networking (SDN) environment 100 in which PMTU discovery may be performed. FIG. 2 is a schematic diagram illustrating example physical view 200 of SDN environment 100 in FIG. 1. It should be understood that, depending on the desired implementation, SDN environment 100 may include additional and/or alternative components than that shown in FIG. 1 and FIG. 2. In practice, SDN environment 100 may include any number of hosts (also known as a "computing devices", "host computers", "host devices", "physical servers", "server systems", "transport nodes," etc.). Each host may be supporting any number of virtual machines (e.g., tens or hundreds).

Referring first to FIG. 1, SDN environment 100 includes multiple hosts, such as host-A 110A ("first host") and host-B 110B ("second host") that are connected via a pair of edges ("network devices") 150-160 and physical network 180. In practice, hosts 110A-B may be located at geographically dispersed sites, such host-A 110A at a first site and host-B 110B at a second site. To facilitate communication between hosts 110A-B over physical network 180, first edge 150 may be deployed at the edge of the first site, and second edge 160 at the edge of the second site. In practice, edge 150/160 may be any suitable network device that is implemented using one or more virtual machines (VMs) and/or physical machines capable of performing functionalities of a switch, router, bridge, gateway, any combination thereof, etc.

Referring also to FIG. 2, first edge 150 and second edge 160 may be VMs supported by respective host-C 110C and host-B 110B. Hosts 110A-C may each include suitable hardware and virtualization software (e.g., hypervisors 112A-C) to support various VMs. For example, at the first site, host-A 110A supports VM1 131 and VM3 133, and host-C 110C supports first edge 150 and VM4 134. At the second site, host-B 110B supports VM2 132 and second edge 160. In an alternative implementation, first edge 150 may be supported by the same host as VM1 131, and/or second edge 160 may be supported by a different host compared to VM2 132. Host-A 110A and host-C 110C may be connected via any suitable physical network 203.

Hypervisor 112A/112B/112C maintains a mapping between underlying hardware 111A/111B/111C and virtual resources allocated to the VMs. Hardware 111A/111B/111C includes various physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications, such as virtual central processing unit (CPU), guest physical memory, virtual disk(s) and virtual network interface controller (VNIC). Hypervisor 112A/112B/112C further implements virtual switch 114A/114B/114C and logical distributed router (DR) instance 116A/116B/116C to handle egress packets from, and ingress packets to, respective VMs.

In practice, logical switches and logical distributed routers may be implemented in a distributed manner and can span multiple hosts 110A-C to connect the VMs. For example, a logical switch may be configured to provide logical layer-2 connectivity to VMs supported by different hosts. The logical switch may be implemented collectively by virtual switches 114A-C of respective hosts 110A-C and represented internally using forwarding tables (e.g., 115A-C) at the respective virtual switches 114A-C. Further, logical distributed routers that provide logical layer-3 connectivity may be implemented collectively by distributed router (DR) instances (e.g., 116A-C) of respective hosts 110A-C and represented internally using routing tables (e.g., 117A-C) at the respective DR instances. Routing tables 117A-C may be each include entries that collectively implement the respective logical distributed routers.

In the example in FIG. 1 and FIG. 2, edge 150/160 may implement a logical service router (SR), which represents a centralized routing component that is deployed to provide centralized stateful services, such as firewall protection, load balancing, network address translation (NAT), etc. In a data center with multiple tenants requiring isolation from each other, a multi-tier topology may be used. For example, a two-tier topology includes an upper tier associated with a provider logical router (PLR) and a lower tier associated with a tenant logical router (TLR). Each tier may include both DRs and SRs, or DRs and SRs on the upper tier (known as "tier-0") but only DRs at the lower tier (known "tier-1"). The multi-tiered topology enables both the provider (e.g., data center owner) and tenant (e.g., data center tenant) to control their services and policies. Each tenant has full control over its TLR policies, whereas common PLR policies may be applied to different tenants. As such, a logical router may be categorized as one of the following types: TLR-DR, TLR-SR, PLR-DR and PLR-SR.

The VMs may send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches of hosts 110A-C, whereas a "virtual switch" (e.g., 114A-C) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Through virtualization of networking services in SDN environment 100, logical overlay networks may be provisioned, changed, stored, deleted and restored programmatically without having to reconfigure the underlying physical hardware architecture. Any suitable protocol(s) may be used to facilitate communication via logical overlay networks, Generic Routing Encapsulation (GRE), Internet Protocol Security (IPSec), Virtual eXtensible Local Area Network (VXLAN), Stateless Transport Tunneling (STT), Virtual Local Area Network (VLAN), Generic Network Virtualization Encapsulation (GENEVE), Network Virtualization using Generic Routing Encapsulation (NVGRE), Layer 2 Tunneling Protocol (L2TP), any combination thereof, etc.

Depending on the desired implementation, first edge 150 and second edge 160 may communicate via a Virtual Private Network (VPN), such as Layer-2 VPN (L2VPN), Layer-3 VPN (L3VPN), etc. In the example in FIG. 1 and FIG. 2, IPSec-based VPN may be implemented by establishing tunnel 190 (e.g., GRE-over-IPSec tunnel) to facilitate secure communication between first edge 150 and second edge 160 over physical network 180. GRE is a tunneling protocol that enables the encapsulation of an arbitrary network layer protocol (i.e., payload protocol) by another arbitrary network layer protocol (i.e., delivery protocol). IPSec facilitates secure communication over GRE tunnels. One example protocol in the IPSec suite is Encapsulating Security Payload (ESP), which provides origin authenticity through source authentication, data integrity through hash functions and confidentiality through encryption protection for IP packets. Although examples will be discussed using VLAN, GRE and IPSec below, it should be understood that any alternative and/or additional protocol(s) may be used.

Using the above examples, packets from a source (e.g., VM1 131) to a destination (e.g., VM2 132) will include encapsulation overhead added by first edge 150 before they are sent over tunnel 190. The term "encapsulation overhead" may refer to one or more outer headers. In the example in FIG. 1, an egress packet (see 101) from VM1 131 may be encapsulated with a first outer header labeled "O1" and a second outer header labeled "O2." Depending on the desired implementation, the first outer header may include a GRE IP header (e.g., 20 bytes), GRE header (e.g., 4 bytes), VLAN (i.e., 802.1Q) tag (4 bytes), etc. In this case, the first outer header may include a source GRE tunnel endpoint IP address (e.g., IP-G1) and a destination GRE tunnel endpoint IP address (e.g., IP-G2).

The second outer header may include an Ethernet header (e.g., 14 bytes), IPSec tunnel IP header (e.g., 20 bytes), ESP header (e.g., 20 bytes), etc. In practice, tunnel endpoint IP information associated with respective first edge 150 and second edge 160 are included in outer headers, which will be removed by second edge 160 before the inner packet is transmitted to VM2 132. For example, the second outer header may include a source IPSec tunnel IP address (e.g., IP-T1) and a destination IPSec tunnel IP address (e.g., IP-T2). Although not shown in FIG. 1 for simplicity, the packet may be padded with encryption-related data, such as ESP trailer data and ESP authentication data before being sent over tunnel 190. In the following examples, the Ethernet header (e.g., 14 bytes) in the second outer header will be ignored during the PMTU discovery process, such as when MAC-over-IP encapsulation is used.

In practice, PMTU discovery may be performed to determine the maximum transmission unit (MTU) between a source (e.g., VM1 131) and a destination (e.g., VM2 132) to avoid or reduce the likelihood of packet fragmentation. During PMTU discovery, the source sends packets carrying a "Do not fragment" (DF) flag that is set to prevent fragmentation. When an intermediate device (e.g., physical router 170) receives a packet with its DF flag set and determines that the size of the packet exceeds a next-hop MTU (e.g., 1500 bytes), the intermediate device will drop the packet and sends an Internet Control Message Protocol (ICMP) "fragmentation needed" (type 3, code 4) notification to the source. This way, the source may learn that fragmentation is required and reduce the packet size accordingly.

However, conventional approaches for PMTU discovery may not work well in SDN environment 100. For example, ICMP only requires routers to return eight bytes (i.e., 64 bits) of the packet that exceeds the next-hop MTU. As such, due to the encapsulation overhead caused by the implementation of logical overlay networks in SDN environment 100, the ICMP "fragmentation needed" notification will only include eight bytes of the outermost header, such as second outer header ("O2") that includes local and peer tunnel endpoint IP information. This truncated portion of the original packet is insufficient for first edge 150 to identify the source (e.g., VM1 131), and therefor unable to relay the notification to the source. This prevents VM1 131 from adjusting its estimated PMTU accordingly, resulting in undesirable delay and retransmissions.

Conventionally, static MTU configuration may be used to address the above problem. In this case, users (e.g., network administrators) are requested to define static MTU values for logical ports (e.g., guest MTU=1500), uplink logical router ports and/or physical NICs to limit the size of the packets. However, static MTU configuration is generally error-prone because users usually do not know the exact encapsulation overhead, especially when multiple layers of encapsulation are used. Static MTU configuration also lacks flexibility and adaptability because packets have to travel via external networks that are beyond the control of network administrators.

PMTU Discovery in SDN Environment

According to examples of the present disclosure, PMTU discovery may be improved in SDN environment 100 using a network device (e.g., first edge 150) to generate and send an error packet to VM1 131 based on an encapsulation overhead associated with the implementation of logical network(s). Using examples of the present disclosure, PMTU discovery may be performed in a more dynamic, accurate and flexible manner without necessitating any static MTU configuration by users. This in turn improves network performance, and reduces the likelihood of packet fragmentation and reassembly in SDN environment 100.

Figure 3:
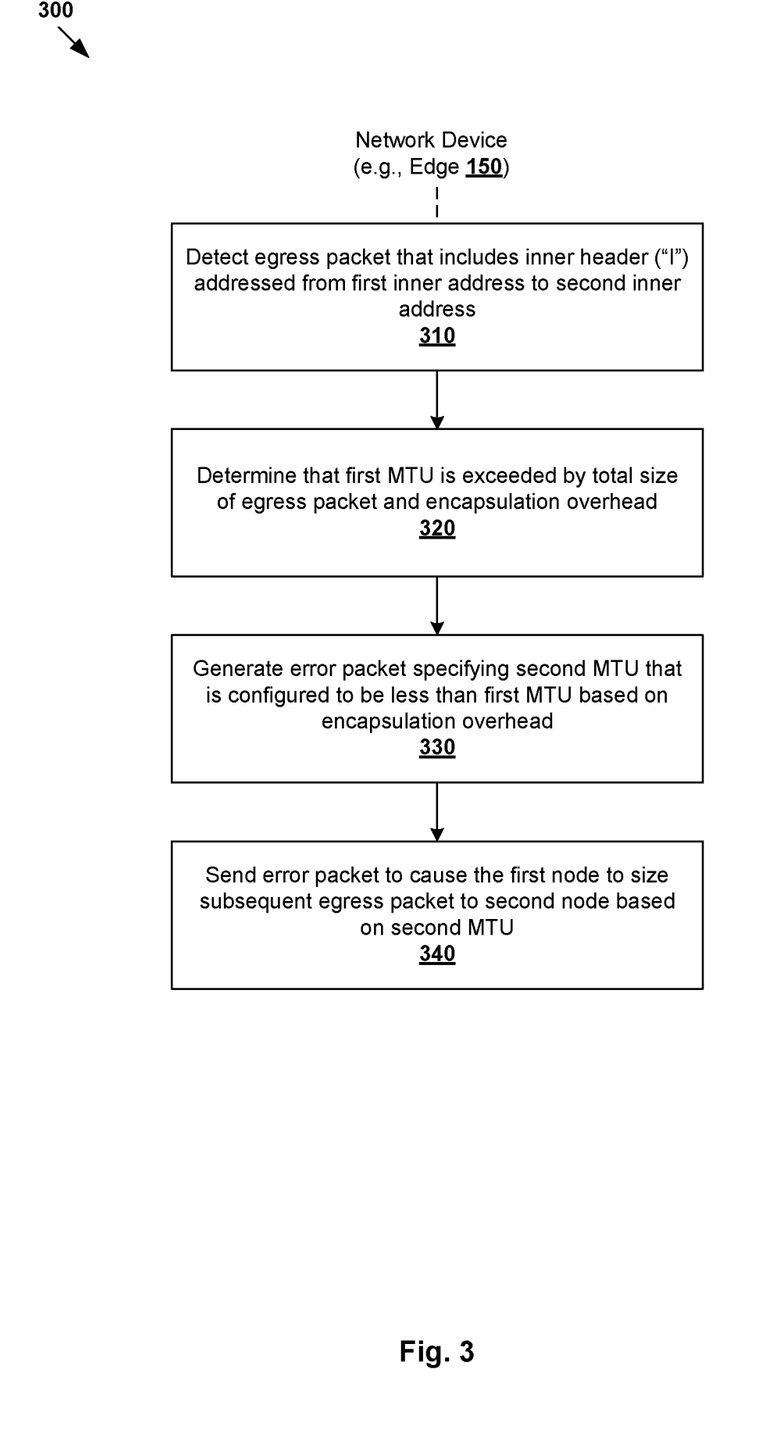
FIG. 3 is a flowchart of an example process for a network device to perform PMTU discovery in an SDN environment.

In more detail, FIG. 3 is a flowchart of example process 300 for a network device to perform PMTU discovery in SDN environment 100. Example process 300 may include one or more operations, functions, or actions illustrated by one or more blocks, such as 310 to 340. The various blocks may be combined into fewer blocks, divided into additional blocks, and/or eliminated depending on the desired implementation. Throughout the present disclosure, various examples will be explained using first edge 150 located at the edge of a first site as an example "network device"; VM1 131 as an example "first node" or "first virtualized computing instance" located at a first site; VM2 132 as an example "second node" or "second virtualized computing instance" located at a second site; router 170 as an example "intermediate device", etc.

At 310 in FIG. 3, first edge 150 detects an egress packet from VM1 131. In the example in FIG. 1, the egress packet includes a payload labelled "P" and an inner header labelled "I that is addressed from a first inner address (e.g., IP-VM1) associated with VM1 131 to a second inner address (e.g., IP-VM2) associated with VM2 132. See corresponding 101 in FIG. 1.

At 320 in FIG. 3, first edge 150 determines that a first MTU associated with a path between VM1 131 and VM2 132 is exceeded by a total size of the egress packet and an encapsulation overhead associated with the egress packet. In the example in FIG. 1, the first MTU (e.g., 1500 bytes) may be a next-hop MTU that is known to router 170 located along the path between VM1 131 and VM2 132. The encapsulation overhead may include a first outer header ("O1") (e.g., 28 bytes) and a second outer header ("O2") (e.g., 40 bytes). In this example, the total size of the egress packet (e.g., 1500 bytes) and the encapsulation overhead (e.g., 28+40=68 bytes) is 1568 bytes, which exceeds the first MTU=1500 bytes. See corresponding 102-103 in FIG. 1.

At 330 in FIG. 3, first edge 150 generates an error packet to VM1 131 based on the encapsulation overhead. In the example in FIG. 1, the error packet may be addressed from the second inner address (e.g., IP-VM2) associated with VM2 132 to the first inner address (e.g., IP-VM1) associated with VM1 131. The error packet specifies a second MTU (e.g., 1432 bytes) that is configured to be less than the first MTU (e.g., 1500 bytes) based on the encapsulation overhead (e.g., 68 bytes). At 340 in FIG. 3, the error packet is sent to VM1 131 to cause VM1 131 to size a subsequent egress packet to the second inner address (e.g., IP-VM2 of VM2 132) based on the second MTU (e.g., 1432 bytes). See corresponding 104 in FIG. 1.

Although various examples are discussed using size=28 bytes for the first outer header and size=40 bytes for the second outer header, it should be understood that the size of the encapsulation overhead may be determined using any suitable approach, such as based on an actual size of the outer header(s) and/or an estimated size, etc. For example, using GRE-over-IPSec, different encryption algorithms and key lengths may result in different packet length changes after encapsulation and padding (e.g., ESP trailer and authentication data). In this case, the size of the encapsulation overhead may be estimated using an "upper bound value" of packet length change to take into account the different encryption algorithms and key lengths that may be applied in practice.

As will be discussed further below, the first MTU mentioned at blocks 320-330 may be specified in a notification (e.g., ICMP "fragmentation needed" notification) received by first edge 150 from router 170. Various detailed examples will be discussed below, such as a reconfiguration approach using FIGS. 4-5 and a learning approach using FIGS. 6-8. In the reconfiguration approach, router 170 may be reconfigured to generate the notification to include a larger chunk of the original packet that includes the inner header ("I") based on which VM1 131 may be identified. In the learning approach, it is not necessary to reconfigure router 170, and first edge 150 may learn the first MTU prior to detecting the egress packet at block 310.

Examples of the present disclosure may be implemented by first edge 150 located at a first site using any suitable component(s), such as processing layers 151-153 (also known as encapsulation/decapsulation handlers), etc. Throughout the present disclosure, the term "first MTU" may refer generally to a next-hop MTU value that is exceeded by an encapsulated packet (i.e., original packet plus encapsulation overhead) along a path between a source and a destination. The term "second MTU" may refer generally to an MTU value that is configured to be less than the first MTU based on the encapsulation overhead.

Example 1

Router Reconfiguration

Figure 4:
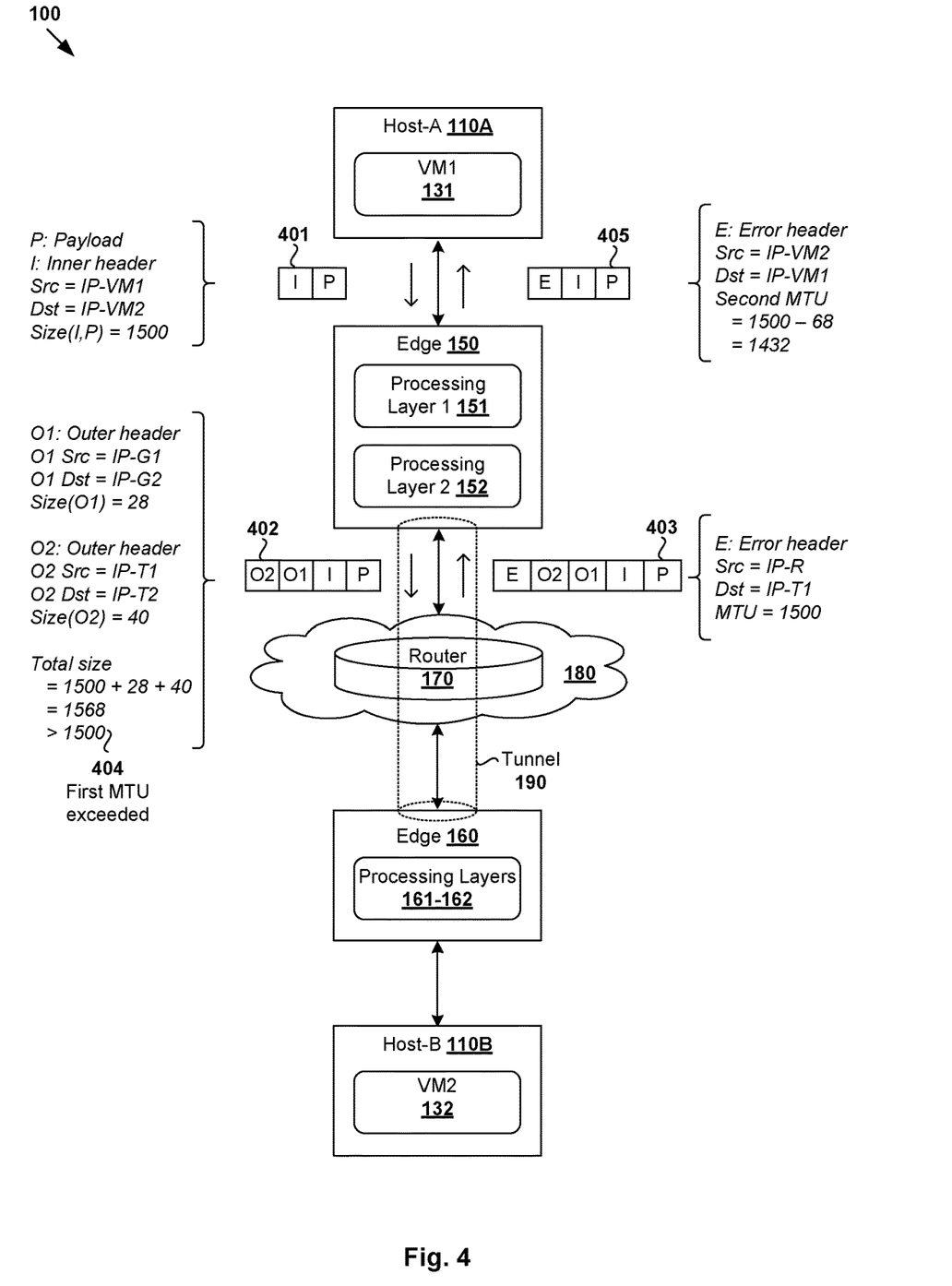
FIG. 4 is a schematic diagram illustrating a first example of PMTU discovery in the SDN environment in FIG. 1.
Figure 5:
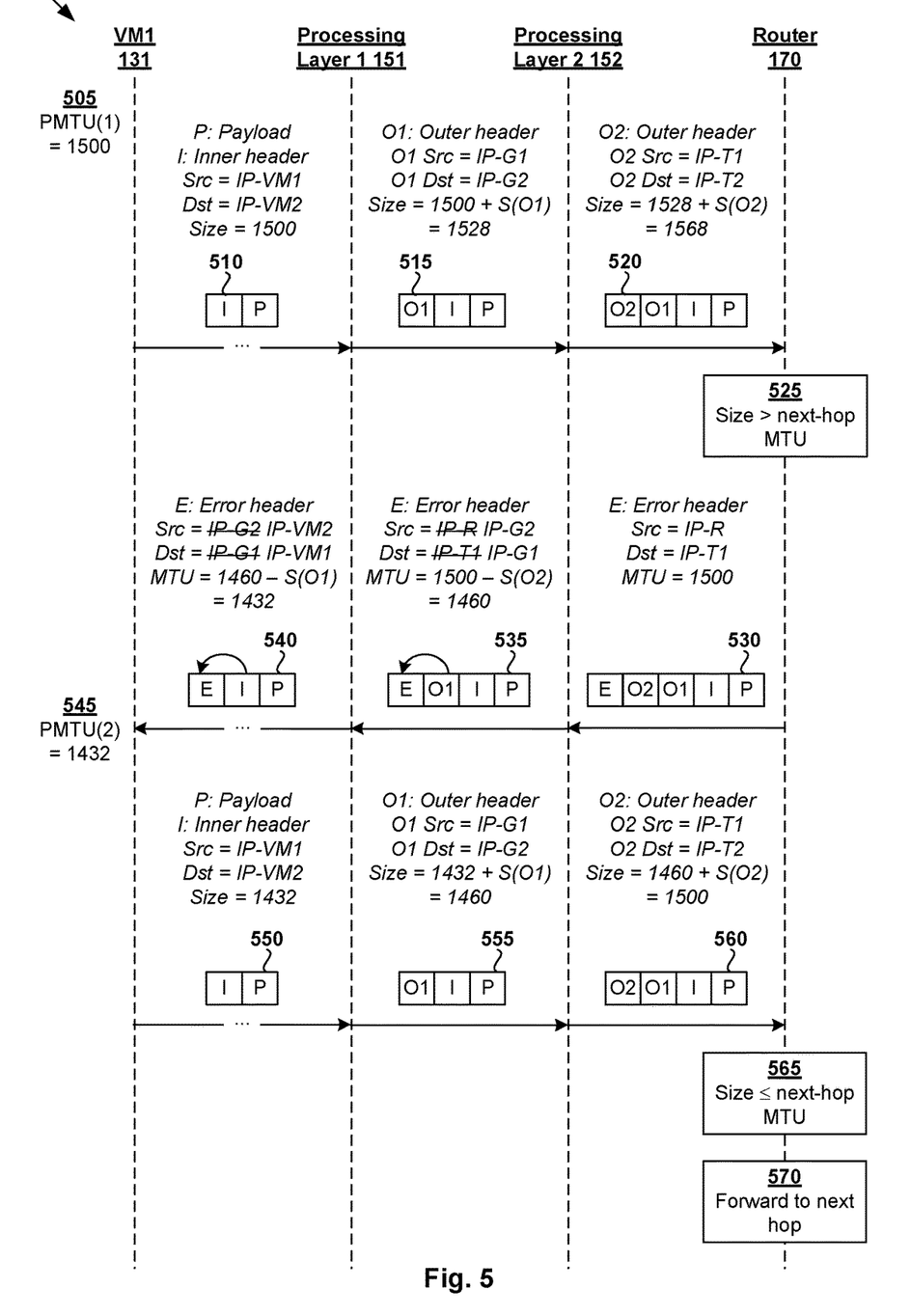
FIG. 5 is a schematic diagram illustrating an example detailed process of PMTU discovery in an SDN environment according to the example in FIG. 4.

According to a first example of the present disclosure, PMTU discovery may be improved by reconfiguring intermediate device(s) such as router 170 to include a larger chunk of the original packet in an ICMP "fragmentation needed" notification (i.e., instead of only eight bytes (i.e., 64 bits) of the original packet). The "larger chunk" should be sufficiently large for first edge 150 to identify and notify source VM1 131. For example, the notification may include the entire original packet (as shown in FIGS. 4-5), or the outer and inner headers of the original packet. The reconfiguration approach is generally shown in FIG. 4, which is a schematic diagram illustrating first example 400 of PMTU discovery in the SDN environment in FIG. 1.

At 401 in FIG. 4 (related to 101 in FIG. 1 and 310 in FIG. 3), first edge 150 detects an egress packet that is addressed from VM1 131 to VM2 132. At 402 in FIG. 4 (related to 102 in FIG. 1 and 320 in FIG. 3), first edge 150 generates and sends an encapsulated packet (e.g., 1568 bytes). At 403 and 404 in FIG. 4 (also related to 103 in FIG. 1 and 320 in FIG. 3), in response to receiving an ICMP "fragmentation needed" notification from router 170, first edge 150 determines that the size of the encapsulated packet exceeds a first MTU (e.g., 1500 bytes). At 405 in FIG. 4 (related to 104 in FIG. 1 and 340 in FIG. 3), first edge 150 generates and sends an error packet to VM1 131. The error packet is addressed from VM2 132 to VM1 132 and specifies a second MTU (e.g., 1432 bytes) that is configured to be less than the first MTU based on the encapsulation overhead.

A more detailed example of how the error packet in FIG. 4 is generated will be explained using FIG. 5, which is a flow diagram of example detailed process 500 of PMTU discovery in SDN environment 100 according to the example in FIG. 4. Example process 500 may include one or more operations, functions, or actions illustrated at 510 to 570. The various operations, functions or actions may be combined into fewer blocks, divided into additional blocks, and/or eliminated depending on the desired implementation. The example in FIG. 5 may be performed using VM1 131, first edge 150 (e.g., using processing layers 151-152) and router 170.

At 510 in FIG. 5, VM1 131 supported by host-A 110A generates and sends an egress packet to VM2 132 supported by host-B 110B. The egress packet includes a payload ("P") and an inner header ("I") that is addressed from VM1 131 (see "Src=IP-VM1") to VM2 132 (see "Dst=IP-VM2"). In the example in FIG. 5, VM1 131 may configure the egress packet based on an initial PMTU estimate, such as PMTU (1)=1500 bytes (see 505).

At 515 and 520 in FIG. 5, in response to receiving the egress packet, first edge 150 processes the egress packet using multiple processing layers 151-152. For example, first processing layer 151 may perform encapsulation according to protocols such as GRE, VLAN, etc. In this case, at 515 in FIG. 5, first processing layer 151 generates a first encapsulated packet by encapsulating the egress packet with a first outer header ("O1"). Depending on the desired implementation, the first outer header may include a VLAN header, a GRE header and a GRE IP header. The first outer header may be addressed from a first GRE tunnel endpoint IP address (see "O1 Src=IP-G1") to a second GRE tunnel endpoint IP address (see "O1 Dst=IP-G2"). After the encapsulation, the first encapsulated packet has a total size of 1500+S(O1) =1528 bytes, where S(O1)=28 bytes is the size of the first outer header.

Next, at 520 in FIG. 5, second processing layer 152 at first edge 150 generates a second encapsulated packet by encapsulating the first encapsulated packet with a second outer header ("O2"). Using IPSec, the second outer header may include ESP information, an outer tunnel IP header, an Ethernet header, etc. In this case, the second outer header is addressed from a first outer tunnel IP address (see "O2 Src="IP-T1") to a second outer tunnel IP address (see "O2 Dst="IP-T2"). The total packet size increases to 1500+S (O1)+S(O2)=1500+28+40=1568 bytes, where S(O2)=40 bytes is the size of the second outer header. The total size of the encapsulation overhead is therefore S(O2)+S(O2)=68 bytes. The second encapsulated packet is then sent to second edge 160 via tunnel 190 established over physical network 180.

At 525 in FIG. 5, in response to receiving the second encapsulated packet, router 170 determines that the size of the second encapsulated packet exceeds a next-hop MTU (e.g., 1528>1500 bytes). At 530 in FIG. 5, based on a DF flag that prevents fragmentation of the second encapsulation packet, router 170 generates and sends an ICMP "fragmentation needed" notification to first edge 150. In practice, the DF flag may be set by source VM1 131 or host-A 110A to enable the PMTU discovery process. Unlike conventional approaches, router 170 has been configured to include a maximum length of the second encapsulated packet (i.e., original packet) supported by router 170, such as the entire original packet or at least its outer and inner headers.

The ICMP "fragmentation needed" notification includes an error header ("E"), which includes an outer IP header followed by an ICMP header. In this example, the outer IP header is addressed from source="IP-R" (i.e., IP address of router 170) to the first outer tunnel IP address="IP-T1" based on outer header ("O2"). The ICMP header specifies a first MTU=1500 bytes (i.e., next-hop MTU) exceeded by the encapsulated packet. ICMP notifications are described in RFC 792, "Internet Control Message Protocol", DARPA Internet Program Protocol Specification, September 1981, which is incorporated herein by reference in its entirety. In the example in FIG. 5, the notification includes the entire length of the original packet, including the outer headers ("O2" and "O1"), inner header ("I") and payload ("P"). This way, in response to receiving the notification, first edge 150 may identify source VM1 131 based on IP-VM1 in the inner header accordingly.

At 535 in FIG. 5, second processing layer 152 generates an error packet by modifying the notification from router 170. This may involve performing decapsulation to remove second outer header ("O2") and modifying the error header ("E") For example, the IP address information in the error header ("E") is modified to replace (source=IP-R, destination=IP-T1) with (IP-G2, IP-G1) based on first outer header ("O1"). Further, based on S(O2)=40 bytes, the MTU in the error header ("E") is reduced from 1500 bytes to 1460 bytes based on S(O2)=40 bytes associated with the second outer header.

At 540 in FIG. 5, first processing layer 151 further modifies the error packet by performing decapsulation to remove first outer header ("O1"). The address information in the error header ("E") is further modified to replace (source=IP-G2, destination=IP-G1) with (IP-VM2, IP-VM1) based on inner header ("I"). Based on S(O1)=28 bytes, the MTU in the error header ("E") is further reduced from 1460 bytes to 1432.

At 545 in FIG. 5, in response to receiving the error packet that specifies MTU=1432 bytes, VM1 131 updates the estimated PMTU associated with the path between VM1 131 and VM2 132 from PMTU(1)=1500 bytes to PMTU(2) =1432 bytes. This way, subsequent egress packets may be sized accordingly. For example, at 550 in FIG. 5, VM1 131 sends an egress packet to VM2 132 with a reduced size=1432 bytes.

At 555 and 560 in FIG. 5, in response to receiving the egress packet, first edge 150 processes the egress packet before sending it to router 170. Similarly, first and second processing layer 151-152 perform encapsulation to generate an encapsulated packet with outer headers "O2" and "O1," inner header ("I") and payload information "P." Compared to the prior encapsulated packet with size=1568 bytes at 520 in FIG. 5, the current encapsulated packet at 560 in FIG. 5 has a reduced size of 1432+S(O1)+S(O2)=1432+28+ 40=1500 bytes.

At 565 and 570 in FIG. 5, in response to receiving the encapsulated packet, router 170 determines that the next-hop MTU=1500 bytes is not exceeded and forwards the encapsulated packet to second edge 160 for subsequent transmission to destination VM2 132 accordingly.

Although not shown for simplicity, it should be understood that hypervisor-A 114A and hypervisor-C 114C may each implement a virtual tunnel endpoint (VTEP) to facilitate packet transmission from VM1 131 to first edge 150. For example, at host-A 110A, a source VTEP implemented by hypervisor-A 114A may encapsulate the egress packet with, for example, a GENEVE header before sending the egress packet to host-C 110C. The GENEVE header includes an identifier of a logical overlay network (e.g., VNI=5000) on which VM1 131 and first edge 150 are located, a source VTEP IP address (e.g., IP-A), and a destination VTEP IP address (e.g., IP-C). At host-C 110C, a destination VTEP implemented by hypervisor-C 114C performs decapsulation to remove the GENEVE header before forwarding the (decapsulated) egress packet with a payload ("P") and an inner header ("I") to first edge 150. Since the GENEVE header is removed before the egress packet is sent to first edge 150, its size does not affect the PMTU discovery process. In practice, any encapsulation technology other than GENEVE may be used, such as VXLAN, etc.

Example 2

Learning Approach

Figure 6:
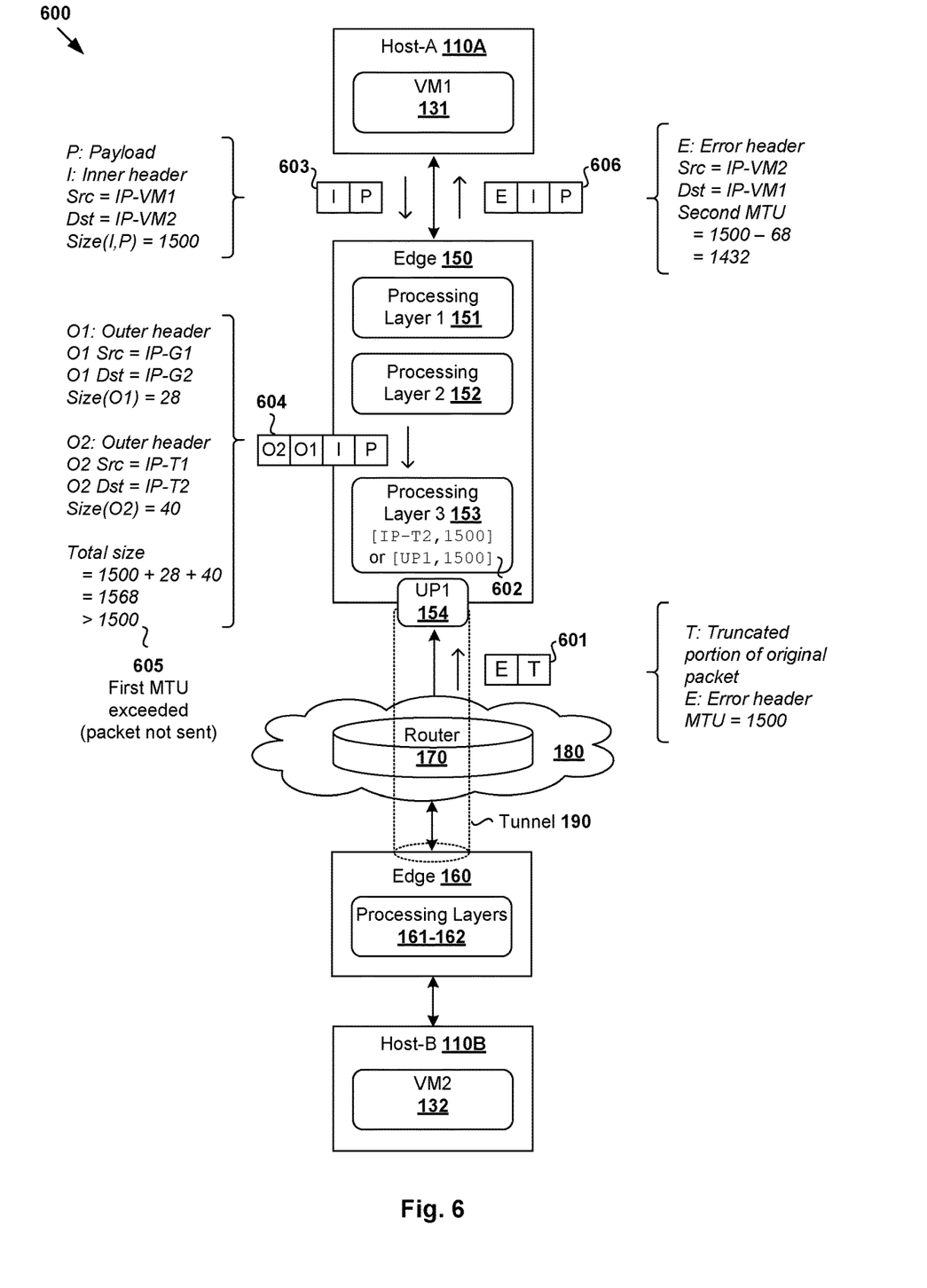
FIG. 6 is a schematic diagram illustrating a second example of PMTU discovery in an SDN environment in FIG. 1.

According to a second example of the present disclosure, PMTU discovery in SDN environment 100 may be improved using a learning approach. Instead of having to reconfigure router 170, first edge 150 may be configured to learn the first MTU associated with a path between VM1 131 and VM2 132, as well as generate and send error packets based on the learned first MTU and encapsulation overhead. The learning approach may be preferred in scenarios where it is challenging to have router 170 reconfigured to return a larger chunk of the original packet. For example, various intermediate devices forming physical network 180 may be manufactured by multiple vendors according to existing standards and managed by different entities. Using the learning approach, reconfiguration of router 170 is not essential, The learning approach is generally shown in FIG. 6, which is a schematic diagram illustrating second example 600 of PMTU discovery in the SDN environment in FIG. 1. In this example, first edge 150 implements processing layers 151-153 and includes an uplink logical port "UP4" 154 of a tier-0 SR that connects with router 170. At 601 and 602 in FIG. 6, first edge 150 learns first MTU=1500 bytes associated with a path between VM1 131 and VM2 132, such as based on an ICMP "fragmentation needed" notification from router 170 specifying that a prior packet has exceeded the first MTU.

At 603 in FIG. 6 (related to 101 in FIG. 1 and 310 in FIG. 3), first edge 150 detects an egress packet that is addressed from VM1 131 to VM2 132. At 604-605 in FIG. 6 (related to 102-103 in FIG. 1 and 320 in FIG. 3), first edge 150 determines that the learned first MTU=1500 bytes is exceeded by an encapsulated packet (e.g., 1568 bytes) that includes the egress packet and an encapsulation overhead. Unlike the first example in FIG. 4 and FIG. 5, the encapsulated packet is not sent because first edge 150 knows that the first MTU will be exceeded. Instead, at 606 in FIG. 6 (related to 104 in FIG. 1 and 340 in FIG. 3), first edge 150 generates and sends an error packet to VM1 131. The error packet is addressed from VM2 132 to VM1 132 and specifies a second MTU (e.g., 1432 bytes) that is configured to be less than the first MTU based on the encapsulation overhead. The error packet may also be referred to as a "proxy error packet" or proxy ICMP notification.

A more detailed example of how the proxy error packet in FIG. 6 is generated will be explained using FIG. 7, which is a flow diagram of first example detailed process 700 of PMTU discovery in SDN environment 100 according to the example in FIG. 6. Example process 700 may include one or more operations, functions, or actions illustrated at 710 to 790. The various operations, functions or actions may be combined into fewer blocks, divided into additional blocks, and/or eliminated depending on the desired implementation.

Figure 7:
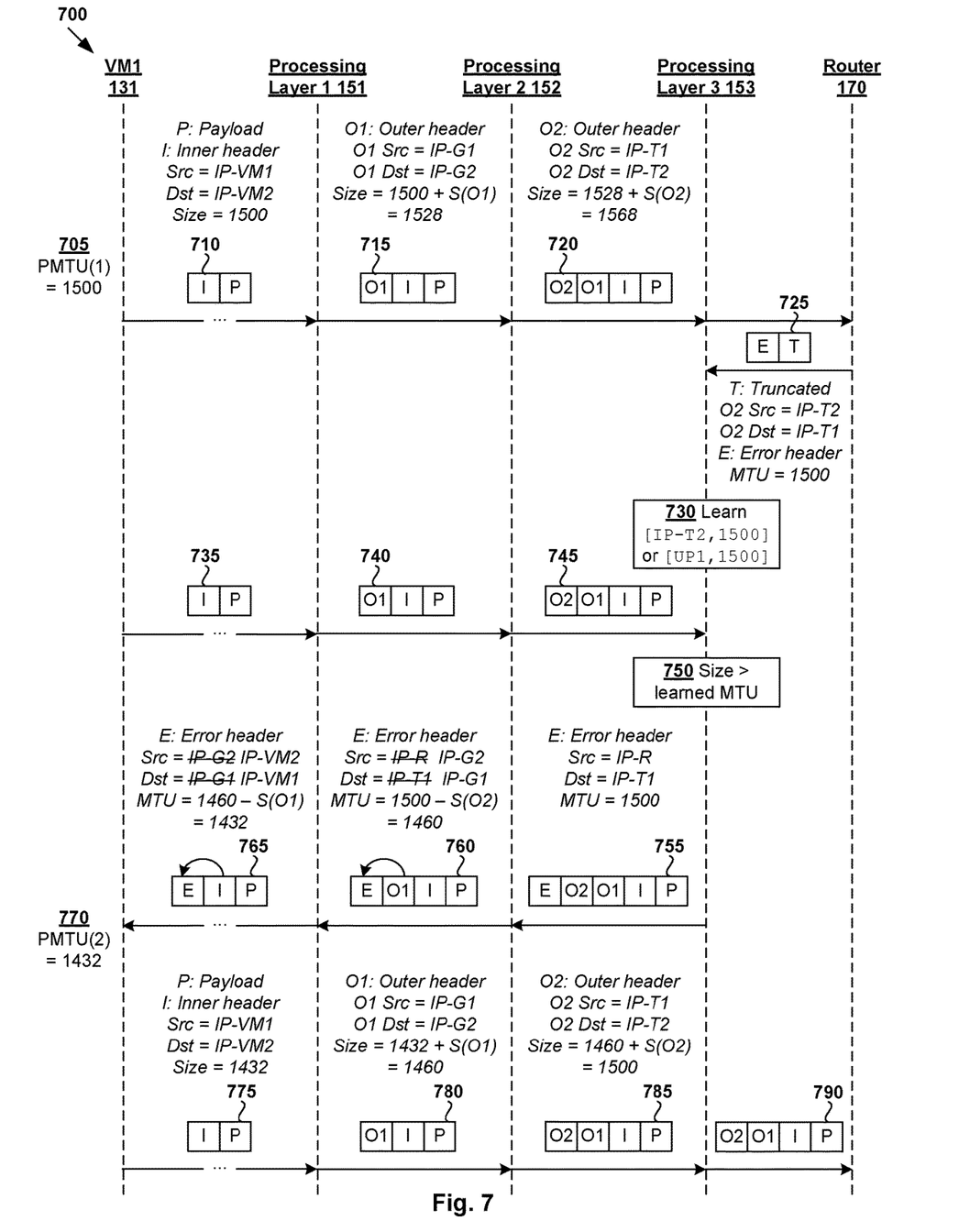
FIG. 7 is a schematic diagram illustrating a first example detailed process of PMTU discovery in an SDN environment according to the example in FIG. 5.

The example in FIG. 7 may be performed using VM1 131, first edge 150 (e.g., using processing layers 151-153) and router 170.

(a) Learning Phase

Similar to the example in FIG. 5, first edge 150 processes a prior egress packet and sends it to router 170 at 705-720 in FIG. 7. The prior egress packet (size=1500 bytes) includes a payload ("P") and an inner header ("I") that is addressed from source VM1 131 (see "IP-VM1") to VM2 132 (see "IP-VM2"). First processing layer 151 generates a first encapsulated packet (size=1528 bytes) by encapsulating the prior egress packet with first outer header ("O1"). Further, second processing layer 152 generates a second encapsulated packet (size=1568 bytes) by encapsulating the first encapsulated packet with outer header ("O2").

At 725 in FIG. 7, in response to receiving the second encapsulated packet with size=1568 bytes, router 170 determines that a next-hop MTU=1500 bytes is exceeded. Based on a DF flag that prevents fragmentation of the second encapsulation packet, router 170 generates and sends an ICMP "fragmentation needed" notification to first edge 150. The notification includes an error header ("E") that includes an outer IP header and an ICMP header. The outer IP header is addressed from an IP address (e.g., IP-R) of router 170 to the first outer tunnel IP address (see "IP-T1") in outer header ("O2"). The ICMP header also specifies next-hop MTU=1500 bytes exceeded by the second encapsulated packet.

However, unlike the first example in FIGS. 4-5, the ICMP "fragmentation needed" notification may be generated using conventional approaches. In this case, the notification may include a truncated portion (see "T") of the second encapsulated packet, such as a small chunk of eight (8) bytes. Since the second outer header ("O2") has a size of S(O2)=40 bytes, the length of 8 bytes is not enough to include the inner header ("I") that allows first edge 150 to identify its source VM1 131. As such, first edge 150 is unable to forward the ICMP "fragmentation needed" notification to VM1 131.

At 730 in FIG. 7, first edge 150 learns first MTU=1500 bytes associated with a path to VM2 132 via router 170 based on the ICMP "fragmentation needed" notification. Depending on the desired implementation, first edge 150 may store any suitable mapping information at a flow level, logical port level, etc. For example, at a flow level, the mapping information may be [IP-T2, 1500] where IP-T2 is a destination address in the second outer header ("O2") in the truncated portion ("T") of the notification. In another example, at a port level, the mapping information may be [UP1, 1500] where "UP1" identifies uplink logical port 154 at a logical router (e.g., PLR-SR) that connects VM1 131 with router 170.

In practice, the mapping information may be cached in run time state and stored in any suitable data structure. For example, using a hash table, a hash lookup may be performed for each encapsulated packet that needs to be sent via tunnel 190. Any suitable aging mechanism may be used such that the mapping information expires after a predetermined time. This way, the mapping information may be learned and relearned periodically.

(b) Proxy Error Packet

At 735-745 in FIG. 7, first edge 150 detects and processes a subsequent egress packet, which may be a retransmission of the prior egress packet at 710 in FIG. 7, or a different packet. Similarly, the egress packet (size=1500 bytes) is addressed from IP-VM1 to IP-VM2. First processing layer 151 generates a first encapsulated packet (size=1528 bytes) by encapsulating the egress packet with first outer header ("O1"). Further, second processing layer 152 generates a second encapsulated packet (size=1568 bytes) by encapsulating the first encapsulated packet with outer header ("O2"). Again, the encapsulation overhead has a size of 68 bytes.

At 750 in FIG. 7, in response to receiving the second encapsulated packet, third processing layer 153 at first edge 150 determines that the learned first MTU=1500 bytes is exceeded by the second encapsulated packet with size=1568 bytes. For example, the determination may involve first edge 150 identifying destination address=IP-T2 in second outer header ("O2") and retrieving associated flow-level mapping information [IP-T2, 1500]. In another example, block 750 may involve first edge 150 selecting uplink logical port UP1 154 to send the second encapsulated packet and retrieving associated port-level mapping information [UP1, 1500].

At 755 in FIG. 7, third processing layer 153 generates a proxy error packet based on the mapping information and sends it to second processing layer 152. Similar to example in FIG. 5, the proxy error packet may include an error header ("E"), second outer header ("O2"), first outer header ("O1"), inner header ("I") and payload ("P"). Similar to the examples in FIGS. 4-5, the error header ("E") may include an outer IP header followed by an ICMP header. The outer IP header is addressed from IP-R (i.e., IP address of router 170, or any other IP address) to IP-T1 in outer header ("O2") and specifies first MTU=1500 bytes exceeded by the second encapsulated packet.

At 760 in FIG. 7, in response to receiving the proxy error packet, second processing layer 152 performs decapsulation to remove second outer header ("O2") and modifies the error header ("E"). In particular, block 760 may involve modifying its address information to replace (source=IP-ft destination=IP-T1) with (IP-G2, IP-G1) based on first outer header ("O1"). Further, the MTU in the error header ("E") is reduced based on S(O2)=40 bytes, i.e., from 1500 bytes to 1460 bytes At 765 in FIG. 7, first processing layer 151 further processes the proxy error packet by performing decapsulation to remove first outer header ("O1"). Further, the address information in the error header ("E") is modified to replace (source=IP-G2, destination=IP-G1) with (IP-VM2, IP-VM1) based on inner header ("I"). The MTU in the error header ("E") is further reduced based on S(O1)=28 bytes, i.e., from 1460 bytes to 1432 bytes.

At 770 in FIG. 7, in response to receiving the proxy error packet that specifies second MTU=1432 bytes, VM1 131 updates the estimated PMTU associated with the path between VM1 131 and VM2 132, such as from PMTU(1) =1500 bytes to PMTU(2)=1432 bytes. The proxy error packet causes VM1 131 to size any subsequent packet to VM2 132 to be less than or equal to second MTU=1432 bytes.

(c) Slow-Path vs Fast-Path

In the example in FIG. 7, first edge 150 generates a proxy error packet (see 755) that includes an entire length of the second encapsulated packet (see 745). In this case, the proxy error packet is modified in stages using processing layers 151-152 to remove the second outer header ("O2") and first outer header ("O1"), and modify the MTU value in the error header ("E") based on the encapsulation overhead. The example in FIG. 7 may represent a slow-path implementation.

Figure 8:
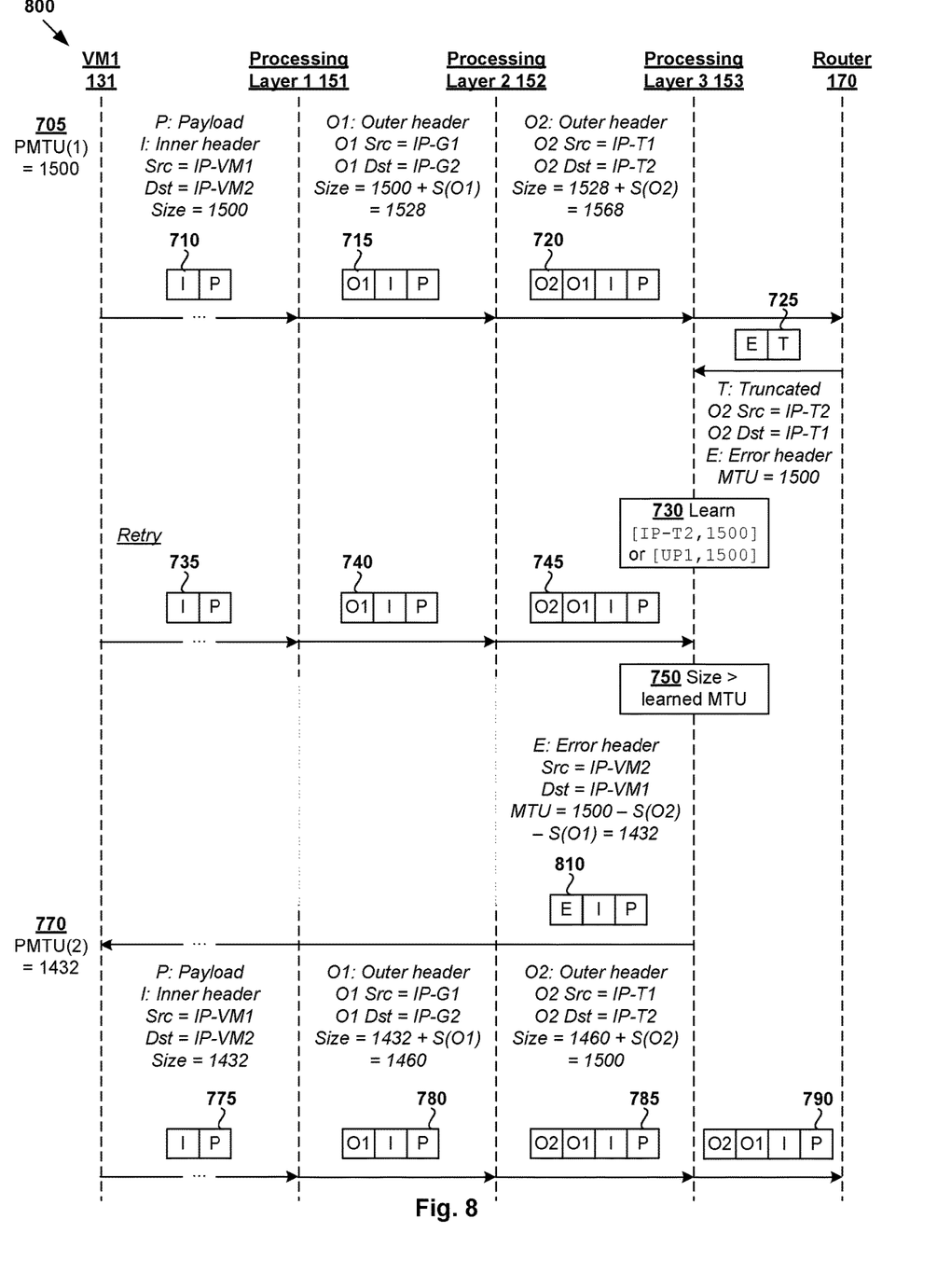
FIG. 8 is a schematic diagram illustrating a second example detailed process of PMTU discovery in an SDN environment according to the example in FIG. 5.

An alternative fast-path implementation is shown in FIG. 8, which is a flow diagram of second example detailed process 800 of PMTU discovery in SDN environment 100 according to the example in FIG. 6. In this case, based on the second encapsulated packet, third processing layer 153 may generate an alternative proxy error packet (see 810) that does not include the second outer header ("O2") and first outer header ("O1"). In this case, the proxy error packet may include an error header ("E"), inner header ("I") and payload ("O").

Since the encapsulation overhead is known, first edge 150 may configure the ICMP header to specify second MTU=1460 bytes based on first MTU=1500 bytes, S(O2) =40 bytes and S(O1)=28 bytes. Further, since source VM1 131 and destination VM2 132 are known from the inner header ("I"), first edge 150 may address the proxy error packet from IP-VM2 to IP-VM1. Compared to the slow-path implementation in FIG. 7, the fast-path implementation in FIG. 8 is more efficient.

Although not shown for simplicity, processing layers 151-153 may include any suitable component(s) to facilitate egress and ingress packet processing. For example, to implement an egress packet processing datapath, processing layers 151-153 may include a VLAN logical switch to add VLAN information, GRE tunnel port to perform GRE encapsulation and forward the packet to a GRE logical port, and a tier-0 SR to perform route lookup, IPSec policy matching, encryption before sending the packet via uplink logical port=UP1 154, etc. To implement an ingress packet processing datapath, processing layers 151-153 may include the tier-0 SR to perform route lookup, IPSec policy matching and decryption, a GRE tunnel endpoint or GRE network tap (GRETAP) to perform decapsulation, the VLAN logical switch to forward the ingress packet to a bridge port, etc.

It should be understood that the learning approach above may implemented using any suitable processing layers other than that shown in FIGS. 6-8. For example, when a tier-0 SR at first edge 150 receives an ICMP "fragmentation needed" notification from router 170 (see 725), mapping information [IP-T2, 1500] may be cached. When a second packet is sent from an IPSec tunnel interface implemented by second processing layer 152 to destination IP-T2 and the second packet exceeds 1500 bytes, the IPSec tunnel interface's MTU may be set to 1460 bytes (i.e., 1500−40). When a third packet from VM1 131 is detected by a GRETAP implemented by first processing layer 151, the GRETAP may check that the next-hop MTU (i.e., IPSec tunnel interface's MTU) is 1460 bytes. If the third packet exceeds 1460−28=1432 bytes, the third packet is not sent to the IPSec tunnel interface. Instead, the GRETAP may generate a proxy error packet that is addressed from source=IP-VM2 to destination=IP-VM1, and MTU=1432 bytes. In other words, proxy error packet 810 in FIG. 8 may be generated and sent by the GRETAP at first processing layer 151.

Hybrid Approach

Depending on the desired implementation, the reconfiguration approach in FIGS. 4-5, the learning approach in FIGS. 6-8, or a combination of both may be implemented. For example in FIG. 5, in response to receiving the ICMP "fragmentation needed" notification (see 530) from router 190, first edge 150 may learn first MTU=1500 bytes according to the learning approach. This way, first edge 150 may apply flow-level mapping information (e.g., [IP-T2, 1500]) or port-level mapping information (e.g., [UP1, 1500]) to subsequent packets between a different pair of nodes, not just VM1 131 and VM2 132.

For example, consider a scenario where VM3 133 supported by host-A 110A sends an egress packet to VM2 132. After encapsulation by processing layers 151-152, first edge 150 may determine that the first MTU=1500 bytes is exceeded based on the flow-level mapping information. Regardless of whether router 170 has been reconfigured according to the examples in FIGS. 4-5, first edge 150 may decide not to send the packet to reduce delay and improve efficiency. Instead, first edge 150 generates and sends a proxy error packet to VM3 133 according to the examples in FIGS. 6-8.

In another example, consider a scenario where VM3 133 sends another egress packet to a destination that is connected to first edge 150 via uplink logical port=UP1 (see 154 in FIG. 6). In this case, if the total size of the egress packet and associated encapsulation overhead exceeds the learned first MTU=1500 bytes, first edge 150 generates and sends a proxy error packet to VM3 133 according to the examples in FIGS. 6-8.

Container Implementation

Although discussed using VMs 131-134, it should be understood that PMTU discovery may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 11 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. Using the examples in FIGS. 1-8, PMTU discovery may be performed in an improved manner for containers in SDN environment 100.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of acting as a host may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for path maximum transmission unit (PMTU) discovery in a software-defined networking (SDN) environment that includes a network device, an intermediate device, a first node, and a second node, the method comprising:
    detecting, by the network device, an egress packet that includes an inner header addressed from a first inner address associated with the first node to a second inner address associated with the second node, wherein the first node communicates the packet to the second node via a path, and wherein the path includes the network device and the intermediate device;
    receiving, by the network device from the intermediate device, a notification that includes a first maximum transmission unit (MTU) associated with the path; and
    in response to determining, by the network device, that the first MTU associated with the path is exceeded by a total size of the egress packet and an encapsulation overhead:
        generating, by the network device, an error packet that is addressed to the first inner address, wherein the error packet specifies a second MTU that is configured to be less than the first MTU based on the encapsulation overhead, wherein generating the error packet comprises modifying, by the network device, the notification received from the intermediate device by replacing the first MTU in the notification with the second MTU, and wherein the second MTU is less than or equal to a difference between (i) the first MTU and (ii) the encapsulation overhead; and
        sending, by the network device, the error packet to the first node to cause the first node to size a subsequent egress packet to the second inner address based on the second MTU.

2. The method of claim 1, further comprising:
    prior to determining that the first MTU is exceeded, generating, by the network device, an encapsulated packet by encapsulating the egress packet with one or more outer headers being the encapsulation overhead, and sending, by the network device, the encapsulated packet to the second node via the intermediate device which is located along the path between the first node and the second node.

3. The method of claim 2, wherein the intermediate device is configured to generate the notification to include at least the inner header based on which the first node is identified.

4. The method of claim 1, wherein determining that the first MTU is exceeded comprises:
    prior to detecting the egress packet, learning, by the network device, the first MTU associated with the path.

5. The method of claim 4, wherein learning the first MTU comprises:
    receiving, by the network device from the intermediate device which is located along the path between the first node and the second node, the notification which specifies that the first MTU is exceeded by a prior encapsulated packet that is addressed to a destination address; and
    storing, by the network device, flow-level mapping information that associates the first MTU with the destination address, or port-level mapping information that associates the first MTU with an identifier of a logical port of the network device via which the notification is received.

6. The method of claim 5, wherein determining that the first MTU is exceeded comprises:
    generating, by the network device, an encapsulated packet by encapsulating the egress packet with one or more outer headers; and
    based on the flow-level mapping information or port-level mapping information, determining, by the network device, that the first MTU is exceeded by the encapsulated packet.

7. A non-transitory computer-readable storage medium that includes a set of instructions which, in response to execution by a processor of a network device, cause the processor to perform a method of path maximum transmission unit (PMTU) discovery in a software-defined networking (SDN) environment that includes the network device, an intermediate device, a first node, and a second node, wherein the method comprises:
    detecting an egress packet that includes an inner header addressed from a first inner address associated with the first node to a second inner address associated with the second node, wherein the first node communicates the packet to the second node via a path, and wherein the path includes the network device and the intermediate device;
    receiving, from the intermediate device, a notification that includes a first maximum transmission unit (MTU) associated with the path; and
    in response to determining that the first MTU associated with the path is exceeded by a total size of the egress packet and an encapsulation overhead:
        generating an error packet that is addressed to the first inner address, wherein the error packet specifies a second MTU that is configured to be less than the first MTU based on the encapsulation overhead; and
sending the error packet to the first node to cause the first node to size a subsequent egress packet to the second inner address based on the second MTU.

8. The non-transitory computer-readable storage medium of claim 7, wherein the method further comprises:
prior to determining that the first MTU is exceeded, generating an encapsulated packet by encapsulating the egress packet with one or more outer headers, and sending the encapsulated packet to the second node via the intermediate device which is located along the path between the first node and the second node.

9. The non-transitory computer-readable storage medium of claim 8, wherein the intermediate device is configured to generate the notification to include at least the inner header based on which the first node is identified.

10. The non-transitory computer-readable storage medium of claim 9, wherein generating the error packet comprises:
modifying the notification received from the intermediate device by replacing the first MTU in the notification with the second MTU, wherein the second MTU is less than or equal to a difference between (i) the first MTU and (ii) a size of the one or more outer headers, being the encapsulation overhead.

11. The non-transitory computer-readable storage medium of claim 7, wherein determining that the first MTU is exceeded comprises:
prior to detecting the egress packet, learning the first MTU associated with the path.

12. The non-transitory computer-readable storage medium of claim 11, wherein learning the first MTU comprises:
receiving, from the intermediate device which is located along the path between the first node and the second node, the notification which specifies that the first MTU is exceeded by a prior encapsulated packet that is addressed to a destination address; and
storing flow-level mapping information that associates the first MTU with the destination address, or port-level mapping information that associates the first MTU with an identifier of a logical port of the network device via which the notification is received.

13. The non-transitory computer-readable storage medium of claim 12, wherein determining that the first MTU is exceeded comprises:
generating an encapsulated packet by encapsulating the egress packet with one or more outer headers; and
based on the flow-level mapping information or port-level mapping information, determining that the first MTU is exceeded by the encapsulated packet.

14. The non-transitory computer-readable storage medium of claim 7, wherein generating the error packet comprises:
modifying the notification received from the intermediate device by replacing the first MTU in the notification with the second MTU, wherein the second MTU is less than or equal to a difference between (i) the first MTU and (ii) a size of the one or more outer headers, being the encapsulation overhead.

15. A network device configured to perform path maximum transmission unit (PMTU) discovery in a software-defined networking (SDN) environment that includes the network device, an intermediate device, a first node, and a second node, the network device comprising:
a processor; and
a non-transitory computer-readable medium having stored thereon instructions that, in response to execution by the processor, cause the processor to:
detect an egress packet that includes an inner header addressed from a first inner address associated with the first node to a second inner address associated with the second node, wherein the first communicates the packet to the second node via a path, wherein the path includes the network device and the intermediate device;
receive, from the intermediate device, a notification that includes a first maximum transmission unit (MTU) associated with the path; and
in response to a determination that the first MTU associated with the path is exceeded by a total size of the egress packet and an encapsulation overhead:
generate an error packet that is addressed to the first inner address, wherein the error packet specifies a second MTU that is configured to be less than the first MTU based on the encapsulation overhead; and
send the error packet to the first node to cause the first node to size a subsequent egress packet to the second inner address based on the second MTU.

16. The network device of claim 15, wherein the instructions further cause the processor to:
prior to the determination that the first MTU is exceeded, generate an encapsulated packet by encapsulating the egress packet with one or more outer headers, and send the encapsulated packet to the second node via the intermediate device which is located along the path between the first node and the second node.

17. The network device of claim 16, wherein the intermediate device is configured to generate the notification to include at least the inner header based on which the first node is identified.

18. The network device of claim 17, wherein the instructions that cause the processor to generate the error packet cause the processor to:
modify the notification received from the intermediate device by replacing the first MTU in the notification with the second MTU, wherein the second MTU is less than or equal to a difference between (i) the first MTU and (ii) a size of the one or more outer headers, being the encapsulation overhead.

19. The network device of claim 15, wherein the instructions that cause the processor to determine that the first MTU is exceeded cause the processor to:
prior to detecting the egress packet, learn the first MTU associated with the path.

20. The network device of claim 19, wherein the instructions that cause the processor to learn the first MTU cause the processor to:
receive, from the intermediate device which is located along the path between the first node and the second node, the notification which specifies that the first MTU is exceeded by a prior encapsulated packet that is addressed to a destination address; and
store flow-level mapping information that associates the first MTU with the destination address, or port-level mapping information that associates the first MTU with an identifier of a logical port of the network device via which the notification is received.

21. The network device of claim 20, wherein the instructions that cause the processor to determine that the first MTU is exceeded cause the processor to:

generate an encapsulated packet by encapsulating the egress packet with one or more outer headers; and based on the flow-level mapping information or port-level mapping information, determine that the first MTU is exceeded by the encapsulated packet.

22. The network device of claim 15, wherein the instructions that cause the processor to generate the error packet cause the processor to:

modify the notification received from the intermediate device by replacing the first MTU in the notification with the second MTU, wherein the second MTU is less than or equal to a difference between (i) the first MTU and (ii) a size of the one or more outer headers, being the encapsulation overhead.

* * * * *